United States Patent [19]

Bruson, deceased et al.

[11] 4,395,532

[45] Jul. 26, 1983

[54] COATING COMPOSITION

[76] Inventors: Herman A. Bruson, deceased, late of Woodbridge, Conn.; by Virginia H. Bruson, executrix, 98 Ansonia Rd., Woodbridge, Conn. 06525

[21] Appl. No.: 361,366

[22] Filed: Mar. 25, 1982

[51] Int. Cl.$^3$ ............................................. C08G 18/30
[52] U.S. Cl. ...................................................... 528/75
[58] Field of Search ............................................ 528/75

[56] References Cited

U.S. PATENT DOCUMENTS

| | | | |
|---|---|---|---|
| 2,358,314 | 9/1944 | Bruson | 568/665 |
| 2,393,609 | 1/1946 | Bruson | 568/665 |
| 2,393,610 | 1/1946 | Bruson | 568/665 |
| 2,393,611 | 1/1946 | Bruson | 568/611 |
| 2,416,250 | 1/1947 | Bruson | 568/611 |
| 3,358,039 | 12/1967 | Chang | 528/75 |

OTHER PUBLICATIONS

Saunders et al., Polyurethanes, Part I, Interscience, N.Y., 1962, pp. 84–86.

Primary Examiner—Maurice J. Welsh
Attorney, Agent, or Firm—Bachman and LaPointe

[57] ABSTRACT

Low cost protective coating composition. The coating composition is the reaction product of at least one polyurethane-forming reagent containing a plurality of isocyanate groups and a material selected from the group consisting of cyclopentadiene, dicyclopentadiene, derivatives thereof, and mixtures thereof.

4 Claims, No Drawings

COATING COMPOSITION

BACKGROUND OF THE INVENTION

It is highly desirable to develop a low cost resistant coating composition. Coating compositions have wide application in a variety of areas. Often, however, coating compositions which provide high chemical resistivity also are characterized by high cost. Clearly, it is desirable to develop such a coating composition which is characterized by low cost.

In addition, it is desirable to develop a low cost coating composition which has a variety of desirable characteristics, especially being resistant to chemical attack for application to wood, particle board, or the like, as well as to metal surfaces such as to aircraft surfaces, for example, to provide resistance to the normally corrosive jet fuels and hydraulic fluids as well as to protect the leading edge of aircraft from foreign matter. It is further desirable to provide such a coating material which can be easily applied in a thin and highly protective coating without changing the physical appearance of the coated material. Further, it is desirable to provide such a coating material which dries quickly under atmospheric conditions.

It can be readily appreciated that the requirements for a successful coating material are numerous and varied. The art has long sought successful coating materials which meet the foregoing requirements with one or more disadvantages frequently significantly detracting from such art materials.

Accordingly, it is a principal object of the present invention to provide a low cost resistant coating composition.

It is a still further object of the present invention to provide such a coating composition which is suitable for a variety of applications and which is easy to apply in a thin highly protective coating for a variety of surfaces such as wood, metal and the like.

Further objects and advantages of the present invention will appear hereinbelow.

SUMMARY OF THE INVENTION

In accordance with the present invention, the foregoing objects and advantages may be readily achieved and a low cost resistant coating composition readily obtained. The coating composition of the present invention is characterized by low cost and good protective qualities. The composition comprises the reaction product of at least one polyurethane-forming reagent containing a plurality of isocyanate groups and a material selected from the group consisting of cyclopentadiene, dicyclopentadiene, derivatives thereof and mixtures thereof. The coating composition is prepared by reacting together the aforesaid materials under ambient conditions, preferably in the presence of an effective catalyst and optionally in the presence of an inert solvent such as benzene or toluene.

DETAILED DESCRIPTION

This invention relates to chemistry and particularly to novel organic polymer compositions adapted to provide desirable and improved physical and chemical properties, particularly when applied as surface coatings over films, foils, and other fabricated articles. The said compositions are formed with the use as a principal starting ingredient of at least one polyurethane-forming reagent containing a plurality, for example two to six, of isocyanate substituent groups per molecular unit, as exemplified by toluene di-isocyanate, diphenylmethane di-isocyanate, phenyl di-isocyanate, diphenyl di-isocyanate or a naphthyl polyisocyanate.

Such a polyisocyanate compound, or a mixture of such compounds, is reacted, in the presence of air and of an effective catalyst such as cobalt, manganese, calcium, lead, naphthenate and others, and optionally in the presence of an inert solvent such as benzene or toluene, with at least about an equivalent amount of cyclopentadiene or dicyclopentadiene, or a hydroxylated derivative thereof, such as monohydroxy or polyhydroxy dicyclopentadiene or a dycyclopentenyl alcohol, epoxide or a mixture of such compounds, which may be formed readily by treating dicyclopentadiene in the presence of oxygen or air.

The reaction proceeds immediately and vigorously, usually indicated by a rise in temperature of the mixture. Generally, as the reaction proceeds and heat is evolved, the solution darkens, attaining a purplish golden color by transmitted light, apparently due to some relatively slight decomposition during the reaction, which results in the formation of some colloidal carbonaceous product.

Generally, equimolar amounts of isocyanate and cyclopentadiene materials are employed based on NCO content of the isocyanate; however, one can readily vary from the equimolar proportions without danger, for example, one would have unreactive substituents which, depending upon the amount thereof, may be readily removed if desired. Ultraviolet light absorbers may be desirable in order to prevent degradation upon exposure to sunlight, such as for example, benzophenones or the like.

As indicated hereinabove, any polyurethane-forming reagent containing a plurality of isocyanate substituent groups per molecular unit may be readily employed. These materials are well known in the art and a variety of such materials may be readily employed. Similarly, the cyclopentadiene or dicyclopentadiene or hydroxylated derivative thereof is well known in the art and typical such materials are exemplified by those described in U.S. Pat. Nos. 2,393,610, 2,358,314, 2,375,767, 2,393,609, 2,393,611 and 2,416,250.

The present invention will be more readily understandable from a consideration of the following illustrative examples.

EXAMPLE I 226.66 grams of liquid polymeric methylene diphenyl di-isocyanate material containing 29.3% NCO was mixed with 250 grams of liquid dicyclopentenyl alcohol at room temperature. 23.8 grams of cobalt naphthanate (6% solution) was added to the mixture as a catalyst. The reactants were mixed together by shaking under ambient conditions. The reaction was accompanied by a rise in temperature until the temperature reached about 130° C. in about 30 minutes. The resultant mixture had a purplish color. The reaction mixture was allowed to cool to room temperature. It took a total of about 55 minutes to attain room temperature from the start of the reaction. Solid crystal material started to precipitate out immediately and the precipitation continued through the reaction and through the cooling until a purplish solid mass was obtained after cooling. 312 grams of toluene was added as a solvent after cooling to dissolve the solid mass.

EXAMPLE II

After dissolving, a portion of the material was applied to an aluminum test plate in a thin film. The film dried to the touch in about 7 minutes. The film was allowed to dry overnight for about 24 hours. The result was a hard brittle colorless coating which was readily soluble in toluene. After 72 hours, the coating was found to be soluble in toluene but not as readily soluble as it was after 24 hours. The resultant coating was a low cost protective coating which was found to be highly protective against a variety of reagents such as alkali.

EXAMPLE III

The coating composition from Example I was applied to a wood surface except that the composition was further diluted in order to permit brush or spray coating application. That is, approximately 600 grams of toluene was used as a solvent to dissolve the solid mass. The resultant coating was brushed on to a plywood material used as a concrete form. A thin film was applied by brushing on two coatings. The first coating was allowed to dry for about 15 minutes and the second coating applied thereafter. The two coatings were allowed to dry for 24 hours. The coated surface was covered with concrete and allowed to set and subsequently allowed to stand for a 6 month perod. The coated plywood material was removed after the 6 months with a result that there was no apparent degradation of the wood surface in contact with the concrete. The coating material was found to be still intact and fully protected the wood surface from corrosion by the alkali concrete.

EXAMPLE IV 142 grams of polymethylene polyphenyl isocyanate material containing 31.5% NCO was mixed with 150 grams of dicyclopentenyl alcohol and 15 grams of cobalt naphthanate (6% solution) was added to the mixture as a catalyst. Liquid toluene was added to the mixture to make up a total of 1 quart of liquid. The ingredients were mixed together by shaking at room temperature. The mixture was found to heat up but not nearly to the extent of the mixture of Example I which did not contain the toluene in the reaction mixture. Further, the reaction mixture never turned solid due to the presence of the toluene, but did thicken during the course of the reaction. The resultant coating composition was applied to plywood as in Example III and covered with concrete and allowed to stand for 6 months also as in Example III. The same results were obtained with this material as in Example III.

EXAMPLE V 24 grams of toluene di-isocyanate containing 48.3% NCO were mixed with 25 grams of dicyclopentenyl alcohol. The materials were shaken together without catalyst and without toluene diluent. The materials reacted together with evolution of heat; however, the reaction mixture did not reach the temperature of Example I due to the lack of catalyst. The highest temperature reached was about 90° C. in about 30 minutes. The mixture was cooled to room temperature which took a total of about 40 minutes from the start of the reaction to cool to room temperature. The result was a solid light brown mass. After cooling, 70 grams of toluene were added to dissolve the solid material. The resultant material was coated on metal plate as in Example II and a highly protective coating resulted.

EXAMPLE VI 30.2 grams of polymeric methylene di-isocyanate containing 30% NCO were reacted with 31.7 grams of dicyclopentenyl alcohol in the presence of 3 grams of cobalt naphthanate (6% solution) and with 49 grams of toluene. The material was reacted together in the same manner as in Example IV. The results were substantially the same as in Example IV. The resultant coating composition was applied to a metal surface and resulted in a highly protective low cost coating composition which was found to be resistant to a variety of chemical reagents.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A low cost resistant coating composition which comprises the reaction product of at least one polyurethane-forming reagent containing a plurality of isocyanate groups and dicyclopentenyl alcohol.

2. A coating composition according to claim 1 wherein the polyurethane-forming reagent contains 2 to 6 isocyanate substituent groups per molecular unit.

3. A coating composition according to claim 1 wherein said polyurethane-forming reagent is selected from the group consisting of toluene di-isocyanate, diphenyl methylene di-isocyanate, polymethylene polyphenyl isocyanate, naphthyl polyisocyanate, phenyl di-isocyanate, and mixtures thereof.

4. A coating composition according to claim 1 wherein the reaction product is mixed with an effective amount of an inert solvent.

* * * * *